(12) United States Patent
Patrick et al.

(10) Patent No.: US 9,934,101 B2
(45) Date of Patent: *Apr. 3, 2018

(54) GRAPHICAL USER INTERFACE RELATIONSHIP GRAPH FOR DISPLAYING RELATIONSHIPS BETWEEN IMAGE BACKUP FILES IN A BACKUP JOB

(71) Applicant: STORAGECRAFT TECHNOLOGY CORPORATION, Draper, UT (US)

(72) Inventors: Nathan A. Patrick, Springville, UT (US); S. Blake Fordham, Lindon, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 560 days.

This patent is subject to a terminal disclaimer.

(21) Appl. No.: 14/569,360

(22) Filed: Dec. 12, 2014

(65) Prior Publication Data

US 2015/0212899 A1 Jul. 30, 2015

Related U.S. Application Data

(63) Continuation of application No. 14/163,892, filed on Jan. 24, 2014, now Pat. No. 8,943,441.

(51) Int. Cl.
*G06F 3/048* (2013.01)
*G06F 11/14* (2006.01)
*G06F 3/0484* (2013.01)
*G06F 11/32* (2006.01)

(52) U.S. Cl.
CPC ........ *G06F 11/1448* (2013.01); *G06F 3/0484* (2013.01); *G06F 11/323* (2013.01); *G06F 11/1469* (2013.01)

(58) Field of Classification Search
None
See application file for complete search history.

(56) References Cited

U.S. PATENT DOCUMENTS

| 6,745,210 B1 | 6/2004 | Scanlan et al. |
| 7,266,781 B1 | 9/2007 | Burlowski |
| 8,145,947 B1 | 3/2012 | Hayden et al. |

(Continued)

OTHER PUBLICATIONS

United States Patent and Trademark Office, Office Action, dated Sep. 6, 2013, 10 pages, in U.S. Appl. No. 13/914,390.

(Continued)

*Primary Examiner* — Jeffrey A Gaffin
*Assistant Examiner* — Ayesha Huertas Torres
(74) *Attorney, Agent, or Firm* — Maschoff Brennan

(57) ABSTRACT

Graphical user interface relationship graph for displaying relationships between image backup files in a backup job. In one example embodiment, one or more non-transitory computer-readable media store a program that causes a processor to generate and visually present, on an electronic display device associated with the processor, a graphical user interface (GUI) relationship graph for displaying relationships between image backup files in a backup job. The GUI relationship graph includes multiple image nodes each representing an image backup file of a source storage and a chain path including multiple links. Each of the links represents a parent-child relationship between one of the image nodes and another of the image nodes.

13 Claims, 5 Drawing Sheets

(56) References Cited

U.S. PATENT DOCUMENTS

| | | | |
|---|---|---|---|
| 8,665,275 B1 | 3/2014 | Patrick et al. | |
| 8,943,441 B1 | 1/2015 | Patrick et al. | |
| 2002/0174140 A1 | 11/2002 | Peake, Jr. et al. | |
| 2004/0030852 A1 | 2/2004 | Coombs et al. | |
| 2006/0047694 A1 | 3/2006 | Anderson et al. | |
| 2008/0282346 A1 | 11/2008 | Gudeth et al. | |
| 2008/0307345 A1 | 12/2008 | Hart et al. | |
| 2009/0282346 A1* | 11/2009 | Bechtel | G06Q 10/10 715/751 |
| 2010/0306171 A1* | 12/2010 | Antos | G06F 11/1448 707/638 |
| 2010/0312754 A1 | 12/2010 | Bear et al. | |
| 2012/0120078 A1 | 5/2012 | Hubbard | |
| 2012/0215743 A1 | 8/2012 | Triantafillos et al. | |
| 2014/0028682 A1* | 1/2014 | Omiya | G09G 5/363 345/440 |

OTHER PUBLICATIONS

United States Patent and Trademark Office, Notice of Allowance, dated Oct. 4, 2013, 7 pages, in U.S. Appl. No. 13/914,390.
United States Patent and Trademark Office, Office Action, dated Jul. 14, 2014, 24 pages, in U.S. Appl. No. 14/163,892.
United States Patent and Trademark Office, Notice of Allowance, dated Nov. 26, 2014, 7 pages, in U.S. Appl. No. 14/163,892.
European Patent Office, European Search Report, dated Dec. 14, 2015, 7 pages, in EP Application No. EP14171665.
European Search Report as issued in European Application No. 15152156.4 dated May 28, 2015, 7 pgs.

* cited by examiner

GRAPHICAL USER INTERFACE RELATIONSHIP GRAPH FOR DISPLAYING RELATIONSHIPS BETWEEN IMAGE BACKUP FILES IN A BACKUP JOB

CROSS-REFERENCE TO A RELATED APPLICATION

This application is a continuation of U.S. patent application Ser. No. 14/163,892, filed Jan. 24, 2014, and titled "GRAPHICAL USER INTERFACE RELATIONSHIP GRAPH FOR DISPLAYING RELATIONSHIPS BETWEEN IMAGE BACKUP FILES IN A BACKUP JOB," which is incorporated herein by reference in its entirety.

FIELD

The embodiments disclosed herein relate to a graphical user interface (GUI) relationship graph for displaying relationships between image backup files in a backup job.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up a source storage is management of the various image backup files related to a backup job for a source storage. Each time that a source storage is backed up during a backup job, an image backup file is created and stored in a destination storage. The history of image backup files created from a source storage during a backup job, as well as certain relationships, timing, and other statistics related to each image backup file, can be very important when ascertaining the current state of a backup job. Where a backup job includes multiple image backup files, it can be difficult to grasp relationships, timing, and other statistics of the image backup files of the backup job in order to ascertain the current state of the backup job.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to a graphical user interface (GUI) relationship graph for displaying relationships between image backup files in a backup job. The example GUI relationship graphs disclosed herein may be employed to visually present the relationships between image backup files in a backup job. The example GUI relationship graphs disclosed herein disclose both image nodes that represent the image backup files that were created during a backup job as well as links between the image nodes that represent parent-child relationships between the image backup files. The example GUI relationship graphs disclosed herein may enable a user to quickly grasp relationships, timing, and other statistics of the image backup files of a backup job in order to ascertain the current state of the backup job, even where the relationships are complex due to image backup files being created as a result of the collapsing, mounting, or copying of image backup files.

In one example embodiment, one or more non-transitory computer-readable media store a program that causes a processor to generate and visually present, on an electronic display device associated with the processor, a graphical user interface (GUI) relationship graph for displaying relationships between image backup files in a backup job. The GUI relationship graph includes a parent image node, a first child image node, and a second child image node. Each image node represents an image backup file of a source storage. The GUI relationship graph also includes a forward branching path including a first link and a second link. The first link represents a first parent-child relationship between the parent image node and the first child image node. The second link represents a second parent-child relationship between the parent image node and the second child image node.

In another example embodiment, one or more non-transitory computer-readable media store a program that causes a processor to generate and visually present, on an electronic display device associated with the processor, a graphical user interface (GUI) relationship graph for displaying relationships between image backup files in a backup job. The GUI relationship graph includes a first parent image node, a second parent image node, and a child image node. Each image node represents an image backup file of a source storage. The GUI relationship graph also includes a reverse branching path including a first link and a second link. The first link represents a first parent-child relationship between the first parent image node and the child image node. The second link represents a second parent-child relationship between the second parent image node and the child image node.

In yet another example embodiment, one or more non-transitory computer-readable media store a program that causes a processor to generate and visually present, on an electronic display device associated with the processor, a graphical user interface (GUI) relationship graph for displaying relationships between image backup files in a backup job. The GUI relationship graph includes multiple image nodes each representing an image backup file of a source storage and a chain path including multiple links. Each of the links represents a parent-child relationship between one of the image nodes and another of the image nodes.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. The term "image backup file" refers to a file that includes a copy of one or more blocks from a storage, and may be a base image backup file, an incremental image backup file, or a collapsed image backup file. The term "backup job" refers to a backup plan for one or more storages of a single computer system that may define a schedule for creating one or more of base image backup file(s), incremental image backup file(s), and collapsed image backup file(s), and may also define various details for the creation of the image backup file(s). The term "snapshot time of an image backup file" refers to the point in time represented by the image backup file, which for base and incremental image backup files may be the point in time at which a snapshot was taken in order to create the image backup file, and which for collapsed image backup files may represent the snapshot time of the most recent incremental image backup file included in the collapsed image backup file. The term "collapsed image backup file" refers to a backup that is created by combining copies of blocks from a combination of multiple sequential base or incremental backup image files into a single backup image file. One example method for creating collapsed backup image files is disclosed in the methods for creating synthetic base backups and synthetic incremental backups in U.S. patent application Ser. No. 13/712,065, titled "PRUNING PREVIOUSLY-ALLOCATED FREE BLOCKS FROM A SYNTHETIC BACKUP," which was filed on Dec. 12, 2012 and which is expressly incorporated herein by reference in its entirety. The term "generation" when used in connection with the term "image backup files" refers to the ordering of image backup files by their snapshot times. For example, where a first image backup file is described as being from an "earlier generation" than a second image backup file, this refers to the snapshot time of the first image backup file being earlier in time than the snapshot time of the second image backup file. Similarly, where a first image backup file is described as being from "the same generation" as a second image backup file, this refers to the snapshot time of the first image backup file being identical to the snapshot time of the second image backup file.

Figure 1:
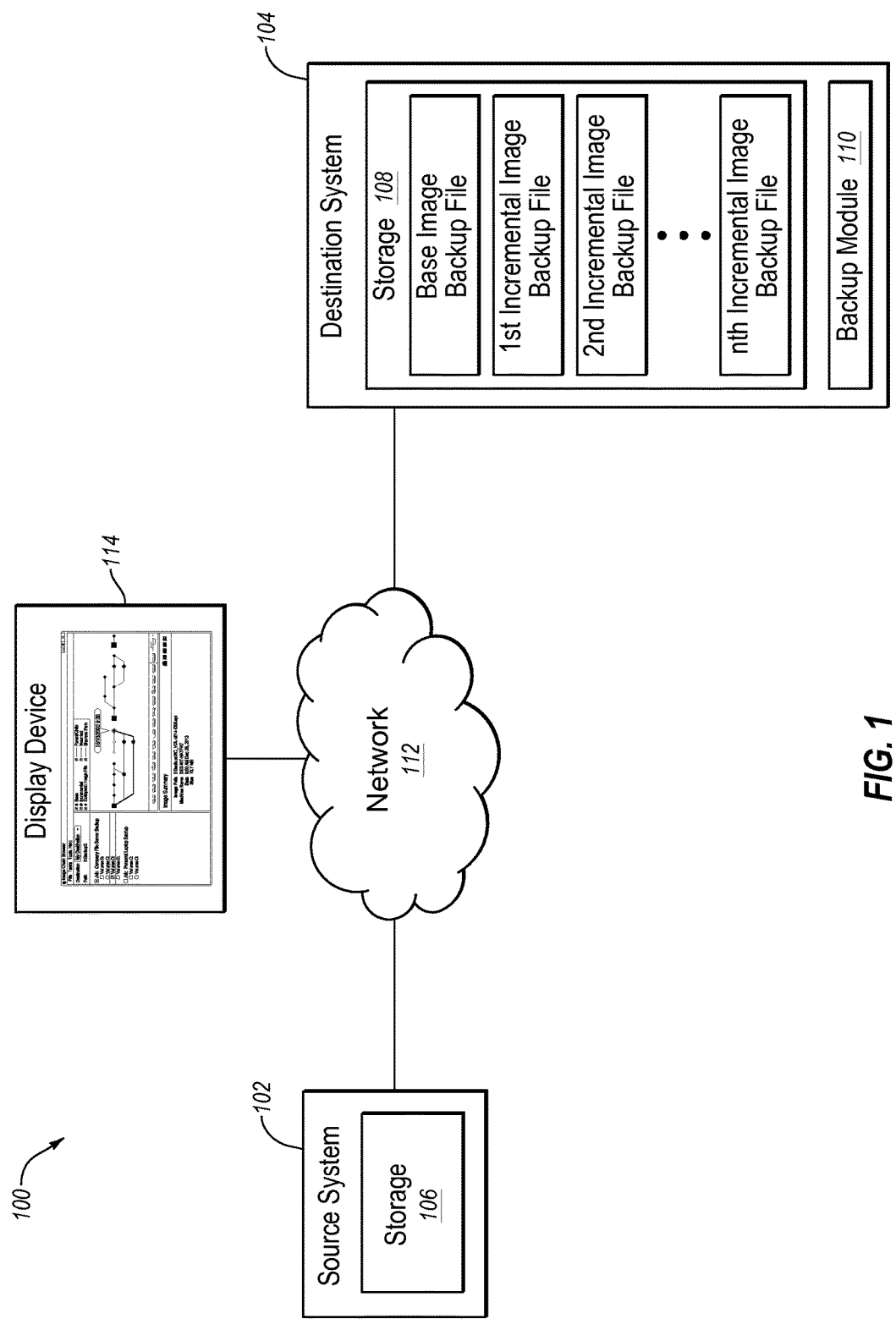
FIG. 1 is a schematic block diagram illustrating an example backup system.

FIG. 1 is a schematic block diagram illustrating an example backup system 100. As disclosed in FIG. 1, the example backup system 100 includes a source system 102 and a destination system 104. The systems 102 and 104 include storages 106 and 108, respectively. The destination storage 108 stores a base image backup file and multiple incremental image backup files that have been created of the source storage 106 to represent various snapshot times. The destination system 104 also includes a backup module 110, although the backup module 110 could instead be included in the source system 102. The systems 102 and 104 are able to communicate with one another over a network 112. A display device 114 may also be associated with the example backup system 100.

Each of the systems 102 and 104 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The display device 114 may be any electronic display device capable of visually presenting a user interface to a user, such as a cathode ray tube (CRT) display, a light-emitting diode (LED) display, an electroluminescent display (ELD), a plasma display panel (PDP), a liquid crystal display (LCD), or an organic light-emitting diode display (OLED). In addition, the display device 114 may be a touchscreen implementation of any electronic display, including the example electronic displays listed above.

The image backup files stored in the destination storage 108 may be created by the backup module 110. For example, the backup module 110 may be configured to execute computer instructions to perform operations of creating a base image backup file and multiple incremental image backup files of the source storage 106. It is noted that these image backup files may initially be created on the source system 102 and then copied to the destination system 104.

For example, the base image backup file may be created to capture the state at time $t(0)$. This may include the backup module 110 copying all allocated blocks of the source storage 106 as allocated at time $t(0)$ and storing the allocated blocks in the destination storage 108. The state of the source storage 106 at time $t(0)$ may be captured using snapshot technology in order to capture the data stored in the source storage 106 at time $t(0)$ without interrupting other processes, thus avoiding downtime of the source storage 106. The base backup may be very large depending on the size of the source storage 106 and the number of allocated blocks at time $t(0)$. As a result, the base backup may take a relatively long time to create and consume a relatively large amount of space in the destination storage 108.

Next, the 1st and 2nd incremental image backup files may be created to capture the states at times $t(1)$ and $t(2)$, respectively. This may include copying only changed allocated blocks of the source storage 106 present at time $t(1)$ and storing the changed allocated blocks in the destination storage 108, then later copying only changed allocated blocks of the source storage 106 present at time $t(2)$ and storing the changed allocated blocks in the destination storage 108. The states of the source storage 106 at times $t(1)$ and $t(2)$ may again be captured using snapshot technology, thus avoiding downtime of the source storage 106. Each incremental image backup file may include only those allocated blocks from the source storage 106 that were changed after the time of the previous backup. Thus, the 1st incremental image backup file may include only those allocated blocks from the source storage 106 that changed between time $t(0)$ and time $t(1)$, and the 2nd incremental image backup file may include only those allocated blocks from the source storage 106 that changed between time $t(1)$ and time $t(2)$. In general, as compared to the base backup, each incremental backup may take a relatively short time to create and consume a relatively small storage space in the destination storage 108.

Finally, an nth incremental backup may be created to capture the state at time $t(n)$. This may include copying only changed allocated blocks of the source storage 106 present at time $t(n)$, using snapshot technology, and storing the changed allocated blocks in the destination storage 108. The nth incremental backup may include only those allocated blocks from the source storage 106 that changed between time $t(n)$ and time $t(n-1)$.

Therefore, incremental image backup files may be created on an ongoing basis. The frequency of creating new incremental image backup files may be altered as desired in order to adjust the amount of data that will be lost should the source storage 106 experience corruption of its stored data or become unavailable at any given point in time. The data from the source storage 106 can be restored to the state at the point in time of a particular incremental image backup file by applying the image backup files from oldest to newest, namely, first applying the base image backup file and then applying each successive incremental image backup file up to the particular incremental image backup file.

Although only allocated blocks are included in the example incremental image backup files discussed above, it is understood that in alternative implementations both allocated and unallocated blocks may be backed up during the creation of a base image backup file or an incremental image backup file. This is typically done for forensic purposes, because the contents of unallocated blocks can be interesting where the unallocated blocks contain data from a previous point in time when the blocks were in use and allocated. Therefore, the creation of base image backup files and incremental image backup files as disclosed herein is not limited to allocated blocks but may also include unallocated blocks.

Further, although only base image backup files and incremental backup files are discussed above, it is understood that the source storage 106 may instead be backed up by creating a base image backup file and one or more decremental image backup files. Therefore, the creation of image backup files as disclosed herein is not limited to a base image backup file and incremental image backup files but may also include a base image backup file and decremental image backup files.

During performance of the example methods disclosed herein, the backup module 110 may identify multiple image backup files in a backup job associated with the source storage. For example, the image backup files in the backup job associated with the source storage 106 may include the base image backup file and the 1st, 2nd, and nth incremental image backup files that are stored in the destination storage 108. The backup module 110 may then present these four image backup files on a GUI relationship graph, on the display device 114 for example, along with parent-child relationships between the image backup files. As discussed in greater detail below, presenting the image backup files in the backup job on a GUI relationship graph enables a user to quickly grasp relationships, timing, and other statistics of the image backup files of the backup job in order to ascertain the current state of the backup job, even where the relationships are complex due to image backup files being created as a result of the collapsing, mounting, or copying of image backup files.

In one example embodiment, the source system 102 may be a desktop computer, the destination system 104 may be a file server, the network 112 may include the internet, and the display device 114 may be an LED monitor in communication with the file server. In this example embodiment, the file server may be configured to periodically back up the storage of the desktop computer over the internet as part of a backup job by creating the base image backup file and the multiple incremental image backup files stored in the destination storage 108. The file server may also be configured to display a history of the backup job on a GUI relationship graph on the LED monitor in order to display relationships between image backup files in the backup job and in order to allow a user to navigate the image backup files of the backup job. The file server may also be configured to restore one or more of the image backup files to the storage of the desktop computer over the internet if the desktop computer experiences corruption or a user simply desires to restore the storage of the desktop computer to an earlier point in time.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a destination system. Further, although the backup module 110 is the only module disclosed in the example backup system 100 of FIG. 1, it is understood that the functionality of the backup module 110 may be replaced or augmented by one or more similar modules residing on either of the systems 102 and 104 or another system. Also, although the display device 114 is disclosed in FIG. 1 as being in remote communication with the source system 102 and the destination system 104 via the network 112, it is understood that the display device 114 may instead be in local communication with the source system 102 or the destination system 104, or another system of the example backup system 100, via a digital video interface (DVI) cable, a video graphics array (VGA) cable, or a high definition multimedia interface (HDMI) cable, for example. It is noted that regardless of whether the display device 114 disclosed in FIG. 1 communicates remotely over the network 112 or locally with the source system 102 or the destination system 104, it may communicate with the backup module 110 using network protocols, for example.

Having described one specific environment with respect to FIG. 1, it is understood that the specific environment of FIG. 1 is only one of countless environments in which the example GUIs disclosed herein may be employed. The scope of the example embodiments is not intended to be limited to any particular environment.

Figure 2:
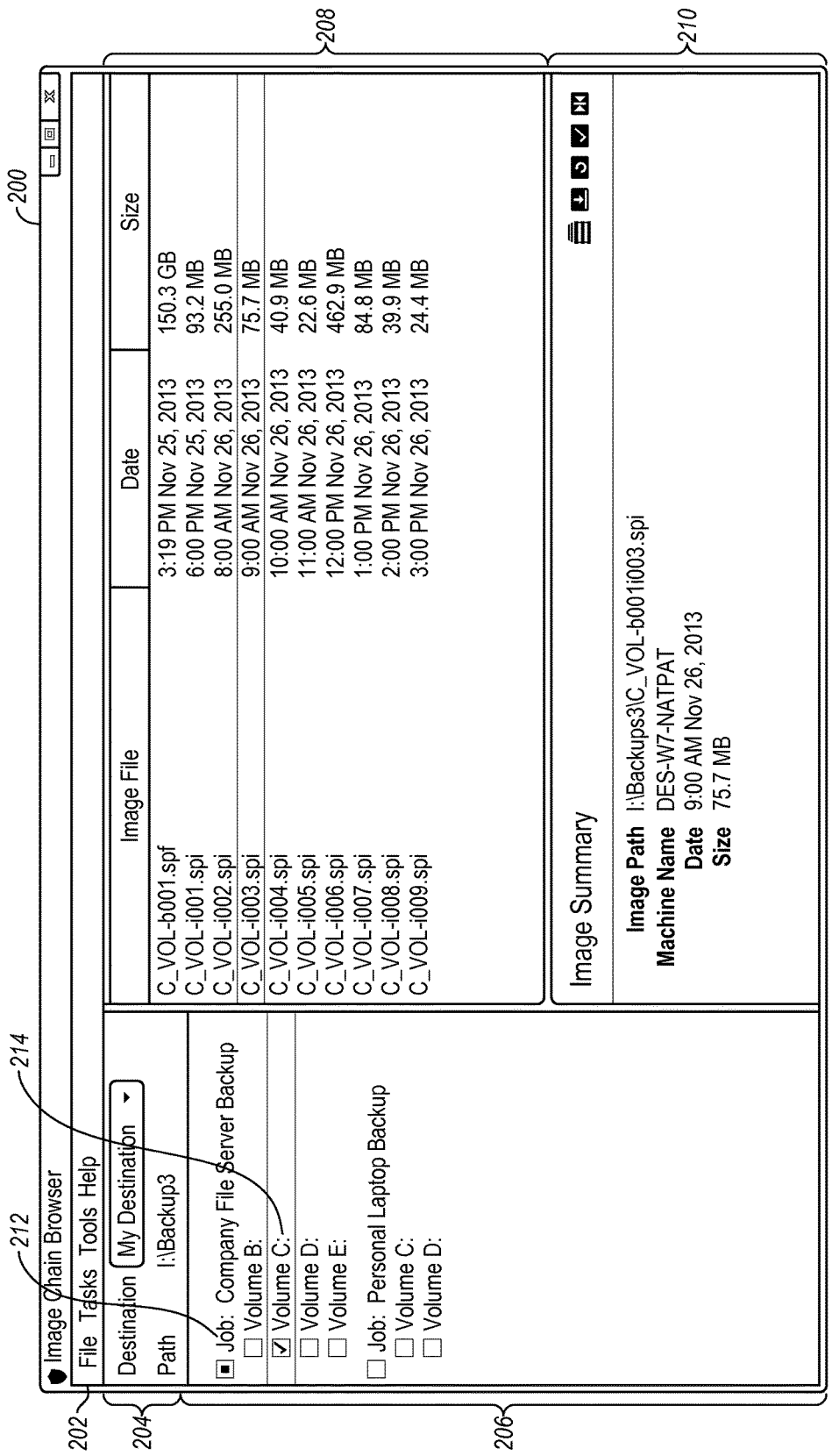
FIG. 2 illustrates an example graphical user interface (GUI) for managing backup jobs including an image backup file list panel that lists image backup files in a backup job.

FIG. 2 illustrates an example GUI 200 for managing backup jobs including an image backup file list panel 208 that lists image backup files in a backup job. The GUI 200 represents a console of the ShadowProtect® system produced by StorageCraft Technology Corporation in Draper, Utah. As disclosed in FIG. 2, the GUI 200 includes a menu bar 202, a destination panel 204, a backup job panel 206, the image backup file list panel 208, and an image backup file summary panel 210.

The menu bar 202 is located at the top of the GUI 200 and provides access to general menus used to configure and operate the ShadowProtect® system. For example, the File menu may provide access to application-level options such as exiting the GUI 200. The Tasks menu may provide access to various ShadowProtect® Wizards such as a Backup Wizard, a Restore Wizard, an Explore Backup Image Wizard, a Backup Image Dismount Wizard, a Verify Image Wizard, and an Image Conversion Tool Wizard. In addition, the Tasks menu may allow the adding of a destination system for image backup files and the refreshing of the volume list for a current system. The Tools menu may provide access to various ShadowProtect® Tools that allow a user to manage image backup files. The Help menu may provide access to ShadowProtect® help resources such as Help Contents, a Product Activation dialog box, a Latest Version dialog box, a Register option, and an About option. It is noted that the menu bar 202 may be optional in the GUI 200, any may instead be included on a main window (not shown) of ShadowProtect® where the GUI 200 is a sub-window of the main window.

The destination panel 204 allows a user to select one of multiple destination systems that are accessible to the ShadowProtect® system. For example, a user may manipulate the dropdown next to the "Destination" label to select from various pre-configured destination systems, such as the destination system 104 of FIG. 1, where backup jobs and their corresponding image backup files may be stored. Once a destination system is selected, the logical path of a corresponding folder where the image backup files are stored on the destination system may be listed next to the "Path" label on the destination panel 204.

The backup job panel 206 provides access to each backup job stored in the destination system that was selected in the destination panel 204 of the ShadowProtect® system. The backup job panel 206 may also allow a user to select a particular backup job, or a particular storage of a backup job. For example, the backup job panel 206 in FIG. 2 displays a backup job 212 named "Company File Server Backup," which may be a name that is either manually entered by a user or automatically chosen by the ShadowProtect® system. In addition to the name of the backup job, the backup job panel 206 may display which storage or storages are included in the backup job. For example, the backup job 212 includes "Volume A:", "Volume B:", "Volume C:", and "Volume D:". Although only two backup jobs are disclosed in FIG. 2, it is understood that only one or three or more backup jobs may be displayed in the backup job panel 206. These additional backup jobs may be related to the same computer or to different computers.

The image backup file list panel 208 lists the image backup files associated with the selected backup job or selected storage in the backup job panel 206. For example, the storage selected in the backup job panel 206 in FIG. 2 is the storage 214 of the backup job 212. Therefore, the list of image backup files displayed in the image backup file list panel 208 includes all image backup files associated with the storage 214. Each of the listed image backup files includes a file extension of ".spf" or ".spi", which stand for "ShadowProtect Full" (the term "full" is synonymous with "base") or "ShadowProtect Incremental", respectively. Therefore, image backup files with a ".spf" file extension are base image backup files and image backup files with a ".spi" file extension are incremental image backup files. In this example, as disclosed in FIG. 2, there is one base image backup file and nine incremental image backup files associated with the storage 214. Each image backup file displayed in the image backup file list panel 208 is listed with its file name (listed in the "Image File" column), its snapshot time (listed in the "Date" column), and its file size (listed in the "Size" column). The details displayed in the image backup file list panel 208 in FIG. 2 are example details only, and it is understood that other details could alternatively or additionally be displayed in the image backup file list panel 208.

The image backup file summary panel 210 displays additional details about the image backup file that is currently selected in the image backup file list panel 208. For example, in FIG. 2 the image backup file summary panel 210 displays additional details about the image backup file named "C_Vol-b001-i003.spi" including the logical path where the image backup file is stored on the destination system, the machine name of the storage from which the image backup file was created, the snapshot time of the image backup file, and the file size of the image backup file.

In addition, the image backup file summary panel 210 displays available action icons that correspond to available actions for the image backup file that is currently selected in the image backup file list panel 208. The five available actions may include, for example, (1) a print action which allows a user to print the additional details displayed in the image backup file summary panel 210, (2) an image details action which brings up a dialog listing additional information about the image backup file, (3) a mount image action which mounts the image data of the image backup file as a new volume on a system, (4) a restore image action which restores the image backup file to an existing volume, overwriting existing data (note—this action may only be available for backups of data volumes and not for a backup of a currently running system volume), and (5) an image conversion action which converts the image backup file to a different format for use in other applications. The details and available actions displayed in the image backup file summary panel 210 in FIG. 2 are example details only, and it is understood that other details or available actions could alternatively or additionally be displayed in the image backup file summary panel 210.

Having described one specific GUI environment with respect to FIG. 2, it is understood that the specific GUI 200 of FIG. 2 is only one of countless environments in which the example GUI relationship graph 300 disclosed herein may be employed. The scope of the GUI relationship graph 300 is not intended to be limited to any particular GUI environment.

Figure 3:
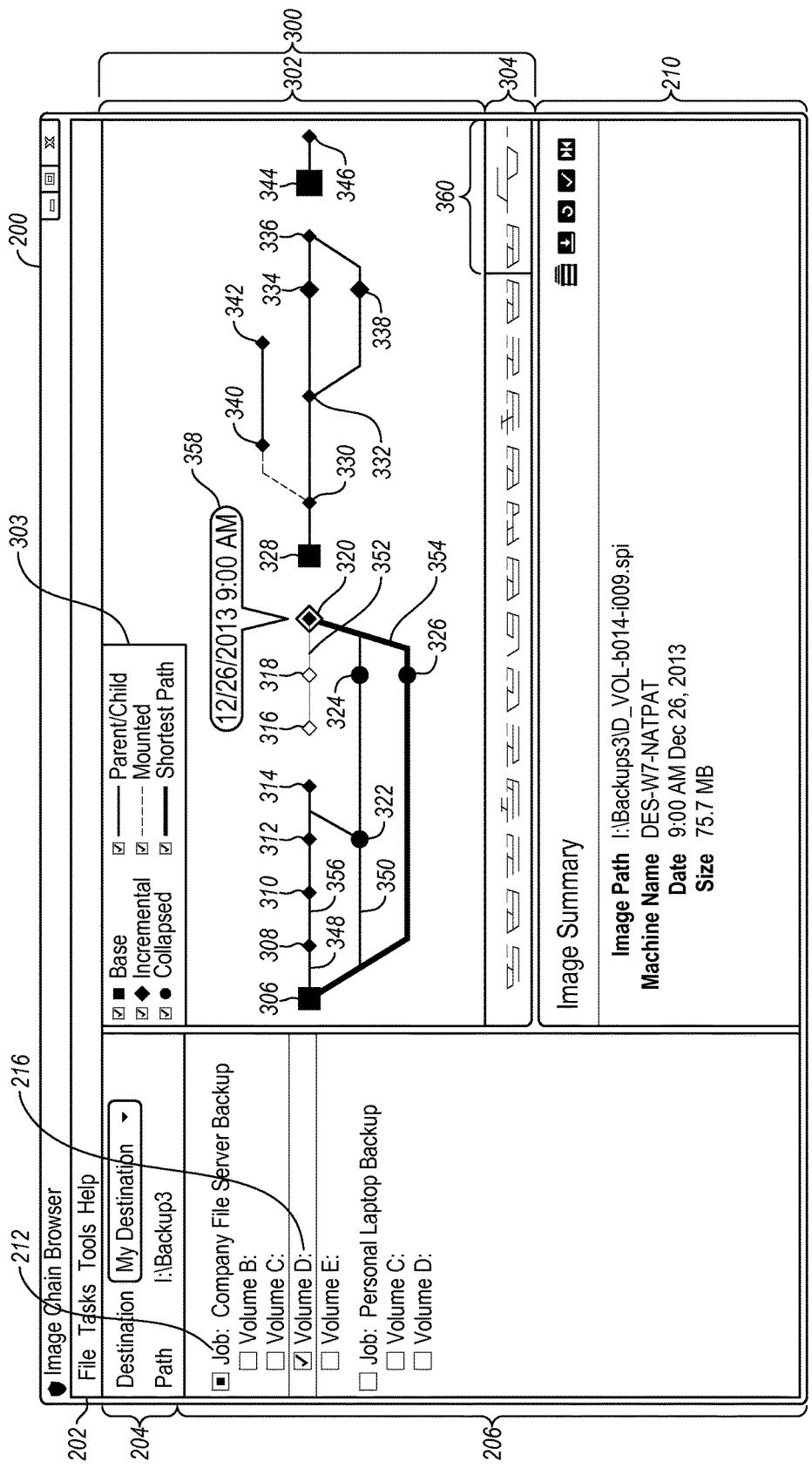
FIG. 3 illustrates the GUI of FIG. 2 in which the image backup file list panel is replaced by an example GUI relationship graph for displaying relationships between image backup files in a backup job.

FIG. 3 illustrates the GUI 200 of FIG. 2 in which the image backup file list panel 208 is replaced by an example GUI relationship graph 300 for displaying relationships between image backup files in a backup job. Similar to the image backup file list panel 208, the GUI relationship graph 300 also displays additional details about the backup job or storage that is currently selected in the backup job panel 206. For example, in FIG. 3 the GUI relationship graph 300 displays additional details about the storage 216, which is labeled "Volume D:", of the backup job 212. However, unlike the image backup file list panel 208 which simply lists the image backup files of selected storage 214 of the backup job 212, the GUI relationship graph 300 visually presents the parent-child relationships between each of the image backup files of the storage 216. In particular, the example GUI relationship graph 300 displays both image nodes that represent the image backup files of the storage 216 of the backup job 212 as well as links that represent the parent-child relationships between the image backup files. Thus, the example GUI relationship graph 300 enables a user to quickly grasp relationships, timing, and other statistics of the image backup files storage 216 of the backup job 212 in order to ascertain the current state of the backup job 212, even where the relationships are complex due to image backup files being created as a result of the collapsing, mounting, or copying of image backup files.

As disclosed in FIG. 3, the GUI relationship graph 300 may generally include a graph display panel 302, a legend 303, and a navigation bar 304.

The graph display panel 302 is configured to display multiple image nodes 306-346 as well as links between the image nodes 306-346. Each of the image nodes 306-346 represents an image backup file of the storage 216 selected in the backup job panel 206. In the example of FIG. 3, the image nodes 306-346 represent image backup files of the storage 214. Each of the links between the image nodes 306-346 represents parent-child relationships between the corresponding image backup files. For example, the link 348 between the base image node 306 and the incremental image node 308 represents a parent-child relationship between the base image backup file represented by the base image node 306 and the incremental image backup file represented by the incremental image node 308. In other words, the base image backup file represented by the base image node 306 is the parent image backup file of the incremental image backup file represented by the incremental image node 308.

The legend 303 may serve a dual function of both presenting a meaning for the shape of each of the image nodes and the style of each of the links, as well as hiding or unhiding events in the graph display panel 302.

In particular, the legend 303 may reveal that the shape of each of the image nodes indicates whether the image node represents a base image backup file, an incremental image backup file, or a collapsed image backup file. For example, the square shape next to the label "Base" indicates that square-shaped image nodes represent base image backup files, the diamond shape next to the label "Incremental" indicates that diamond-shaped image nodes represent incremental image backup files, and the circle shape next to the label "Collapsed" indicates that circle-shaped image nodes represent collapsed image backup files. It is understood that the shape of each of the image nodes is just one example indication of the type of image backup file represented by the image node, and the type of image backup file represented by each image node may alternatively or additionally be indicated by at least one of a color, a texture, and a pattern of each image node.

Further, the legend may reveal that the style of each of the links represents an event that resulted in the creation of the corresponding child image node. For example, the thin style of the line next to the label "Parent/Child" indicates that thin-lined links represent parent-child relationships between image nodes, the dashed style of the line next to the label "Mounted" indicates that dashed-lined links represent parent-child relationships that resulted from the mounting of one or more image backup files, and the thick or bolded style of the line next to the label "Shortest Path" indicates that thick-lined or bolded-lined links represent the shortest path between the incremental image backup file represented by a selected image node and the corresponding ancestor image node that represents the base image backup file of the incremental image backup file.

In addition, the checkbox next to each image node type or each link type in the legend 303 may also function as a toggle control to allow a user to alternately hide or unhide corresponding image nodes or links in the graph display panel 302. For example, the legend 303 in FIG. 3 has all image node types and link types unhidden in the graph display panel 302, but it is understood that any of the image node types and link types may be hidden by simply selecting, and thereby toggling, the checkbox next to each corresponding image node type or link type in the legend 303. It is understood that the toggle control disclosed in FIG. 3 is just one example type of control, and other types of toggle controls could alternatively or additionally be employed in the legend 303.

The graph display panel 302 may be configured to display the image nodes 306-346 and their corresponding links positioned along a horizontal axis. The horizontal axis may represent a generational order of the image backup files represented by the image nodes 306-346. The generational order of the horizontal axis is ordered in the graph display panel 302 with the oldest generation to the left and the newest generation to the right. For example, the fact that the image node 340 is positioned to the left of the image node 332 indicates that the image backup file represented by the image node 340 was of an earlier generation than the image backup file represented by the image node 332. Similarly, the fact that the image nodes 318, 324, and 326 are positioned in the same horizontal position indicates that the image backup files represented by the image nodes 318, 324, and 326 are of the same generation. The relative size of the image nodes may also correspond to the relative file size of the image backup files they represent. For example, the fact that the image node 334 is larger than the image node 332 may indicate that the image backup file represented by the image node 334 is larger than the image backup file represented by the image node 332. The relative sizes of the image nodes may also be proportional to the file sizes of the corresponding image backup files. For example, the fact that the image node 334 is about double the size of the image node 332 may indicate that the file size of the image backup file represented by the image node 334 is about double the file size of the image backup file represented by the image node 332. This display of relative sizes of image nodes may only apply to incremental image nodes, for example, to enable a user to quickly ascertain which incremental image nodes represent relatively large or small incremental image backup files.

The graph display panel 302 may be further configured to display the image nodes 306-346 and their corresponding links positioned along a vertical axis. The vertical axis may represent branch levels of the image backup files represented by the image nodes 306-346. The branch levels of the vertical axis are arranged in FIG. 3 with the standard image backup files created during the backup job represented along a baseline level, with image backup files created as a result of collapsing and copying represented on one or more levels below the baseline level, and image backup files created as a result of mounting represented on one or more levels above the baseline level. For example, the fact that the image node 338 is positioned on a level below the baseline level, combined with the fact that the image node 338 is not a collapsed image node, indicates that the image node 338 was created as a result of copying the image backup file represented by the image node 334. Similarly, the fact that the image node 340 is positioned on a level above the baseline level indicates that the image node 340 was created as a result of mounting the image backup files represented by the image nodes 278 and 280.

It is understood that in the foregoing discussion the horizontal and vertical axes could be reversed and/or be replaced with axes that are not perfectly horizontal or vertical such as diagonal axes. It is also understood that the left to right ordering of the generational order could be reversed and the positions of the levels could be rearranged.

The graph display panel 302 may be further configured to display various types of relationships between the image nodes 306-346, including relationships represented by forward branching paths, reverse branching paths, and chain paths.

A forward branching path involves a parent image node, a first child image node, and a second child image node and includes a first link representing a first parent-child relationship between the parent image node and the first child image node and a second link representing a second parent-child relationship between the parent image node and the second child image node. For example, the graph display panel 302 of FIG. 3 displays a parent image node 306, a first child image node 308, and a second child image node 322. The branching path between the image nodes 306, 308, and 322 includes the first link 348 that represents a first parent-child relationship between the parent image node 306 and the first child image node 308 and a second link 350 that represents a second parent-child relationship between the parent image node 306 and the second child image node 322. This type of branching path is referred to as a forward branching path because the branch occurs as the graph moves forward in generational time of the GUI relationship graph 300.

A reverse branching path involves a first parent image node, a second parent image node, and a child image node and includes a first link representing a first parent-child relationship between the first parent image node and the child image node and a second link representing a second parent-child relationship between the second parent image node and the child image node. For example, the graph display panel 302 of FIG. 3 displays a first parent image node 318, a second parent image node 326, and a child image node 320. The branching path between the image nodes 318, 326, and 320 includes the first link 352 that represents a first parent-child relationship between the first parent image node 318 and the child image node 320 and a second link 354 that represents a second parent-child relationship between the second parent image node 326 and the child image node 320. This type of branching path is referred to as a reverse branching path because the branch occurs in the reverse of the generational time of the GUI relationship graph 300.

A chain path involves multiple image nodes and includes multiple links each representing a parent-child relationship between one of the image nodes and another of the image nodes. For example, the graph display panel 302 of FIG. 3 displays multiple image nodes 306-310. The chain path between the image nodes 306-310 includes the first link 348 that represents a first parent-child relationship between the image node 306 and the image node 308 and a second link 356 that represents a second parent-child relationship between the image node 308 and the image node 310. This type of path is referred to as a chain path because the image nodes are chained together in the GUI relationship graph 300.

Having given a general description of forward branching paths, reverse branching paths, and chain paths, as disclosed in the graph display panel 302 of FIG. 3, a specific description of the relationship graphs displayed in the graph display panel 302 of FIG. 3 will now be undertaken. However, the scope of the example embodiments is not intended to be limited to any graph having any particular combination of forward branching paths, reverse branching paths, and chain paths.

The leftmost graph displayed in the graph display panel 302 of FIG. 3 includes a base image node 306 which is an ancestor to a chain of incremental image nodes 308-314. The base image node 306 is also an ancestor of the collapsed image node 322, which was created by collapsing incremental image nodes 308-312. The base image node 306 is also an ancestor of collapsed image nodes 324 and 326. The base image node 306 is also an ancestor of incremental image nodes 316 and 318, but the missing link between image nodes 314 and 316 represents one or more missing image nodes. In other words, the image backup file that is the parent of the image backup file represented by the image node 316 is missing from the destination selected in the destination panel 204. Without the parent image backup file, the image backup files represented by the incremental image nodes 316 and 318 are rendered orphans, and cannot be restored until the parent image backup file is located. The image nodes 316 and 318, as well as the links following the image nodes 316 and 318, may be faded or otherwise deemphasized to indicate that the image nodes 316 and 318 are orphaned image nodes and their links are not part of a valid path back to a base image node. The base image node 306 is also an ancestor of an incremental image node 320. As disclosed in FIG. 3, even though the image node 320 is a child of the orphaned image node 318, two other valid paths back to the base image node 306 exist, either through the collapsed image nodes 324 and 322, or through the collapsed image node 326.

As disclosed in FIG. 3, the image node 320 has been selected by the user by, for example, the user positioning a mouse cursor over the image node 320 and clicking the mouse button to select the image node 320. Upon selection, the graph display panel 302 is configured to identify the shortest path between the image node 320 and its ancestor base image node, which in this example is the base image node 306, and modify the appearance of the links in the shortest path to match the style of the link next to the label "Shortest Path" in the legend 303. Also upon selection, the image node 320 is highlighted by, for example, outlining the image node 320 with a border as disclosed in FIG. 3. The graph display panel 302 is further configured, upon selection of the image node 320, to visually present additional details regarding the image backup file corresponding to the image node 320. As disclosed in FIG. 3, these additional details may be displayed in a flag 358 and may include the snapshot time of the corresponding image backup file, for example. Further, upon selection of the image node 320, or selection of the flag 358, additional details and available actions of the corresponding image backup file may be presented to the user, for example, in the image backup file summary panel 210, as discussed above in connection with FIG. 2.

The middle graph displayed in the graph display panel 302 of FIG. 3 includes a base image node 328 which is an ancestor to a chain of incremental image nodes 330-336. The base image node 328 is also an ancestor of an incremental image node 338, which was created by copying the incremental image node 334. The base image node 328 is also an ancestor to an incremental image node 340, which was created as a result of mounting the image backup files corresponding to the base image node 328 and the incremental image node 330. The incremental image node 342 was subsequently created as a child image node of the image node 340. As disclosed in FIG. 3, the incremental image node 336 has two paths back to the base image node 328, either through the image nodes 334, 332, and 330, or through the image nodes 338, 332, 330. In this example, both paths have an equal distance, resulting in two equivalent shortest paths.

The partial rightmost graph displayed in the graph display panel 302 of FIG. 3 includes a base image node 344 which is a parent to an incremental image node 346. The incremental image node 346 represents the most recent image backup file created of the storage 216 during the backup job 212.

The navigation bar 304 displays a thumbnail version of all relationship graphs, including all forward branching paths, reverse branching paths, and chain paths corresponding to the selected storage 216, from the creation of the backup job 212 to the most recent creation of an image backup file as part of the backup job 212. The navigation bar 304 is configured to allow discrete generational periods, such as the generational period 360, to be selected and viewed in the larger graph display panel 302. The generational period may be modified by the user to include a shorter or longer generational period than the generational period 360, and the scale of the graph display panel 302 may be modified to accommodate the shorter or longer generational period. The navigation bar 304 may further be configured to list the snapshot times of the oldest image node, near the leftmost edge, and the newest image node, near the rightmost edge, represented in the thumbnail versions of the relationship graphs in order to give the user an idea of the range of snapshot times associated with the navigation bar 304.

Although not disclosed in FIG. 3, it is understood that the GUI relationship graph 300 may be configured to display relationship graphs associated with multiple storages simultaneously. For example, checkboxes next to all four storages listed under the backup job 212 may be configured to be checked in order to allow the user to select corresponding additional relationship graphs, with their associated image nodes and links, to display simultaneously. These additional relationship graphs may be displayed as an overlay using different colors that are color-coded to each storage, or may be displayed above or underneath one another. These additional relationship graphs may further be represented as thumbnails in the navigation bar 304. In this manner, where multiple image nodes of different relationship graphs are of the same generation, this fact can be quickly ascertained by the user, and the corresponding multiple storages of the backup job can be restored to the same snapshot time of the multiple image nodes.

The example GUI relationship graph 300 of FIG. 3 may therefore be employed to visually present the relationships between image backup files in the backup job 212. The example GUI relationship graph 300 of FIG. 3 may enable a user to quickly grasp relationships, timing, and other statistics of the image backup files of the backup job 212 in order to ascertain the current state of the backup job 212, even where the relationships are complex due to image backup files being created as a result of the collapsing, mounting, or copying of image backup files.

Figure 4:
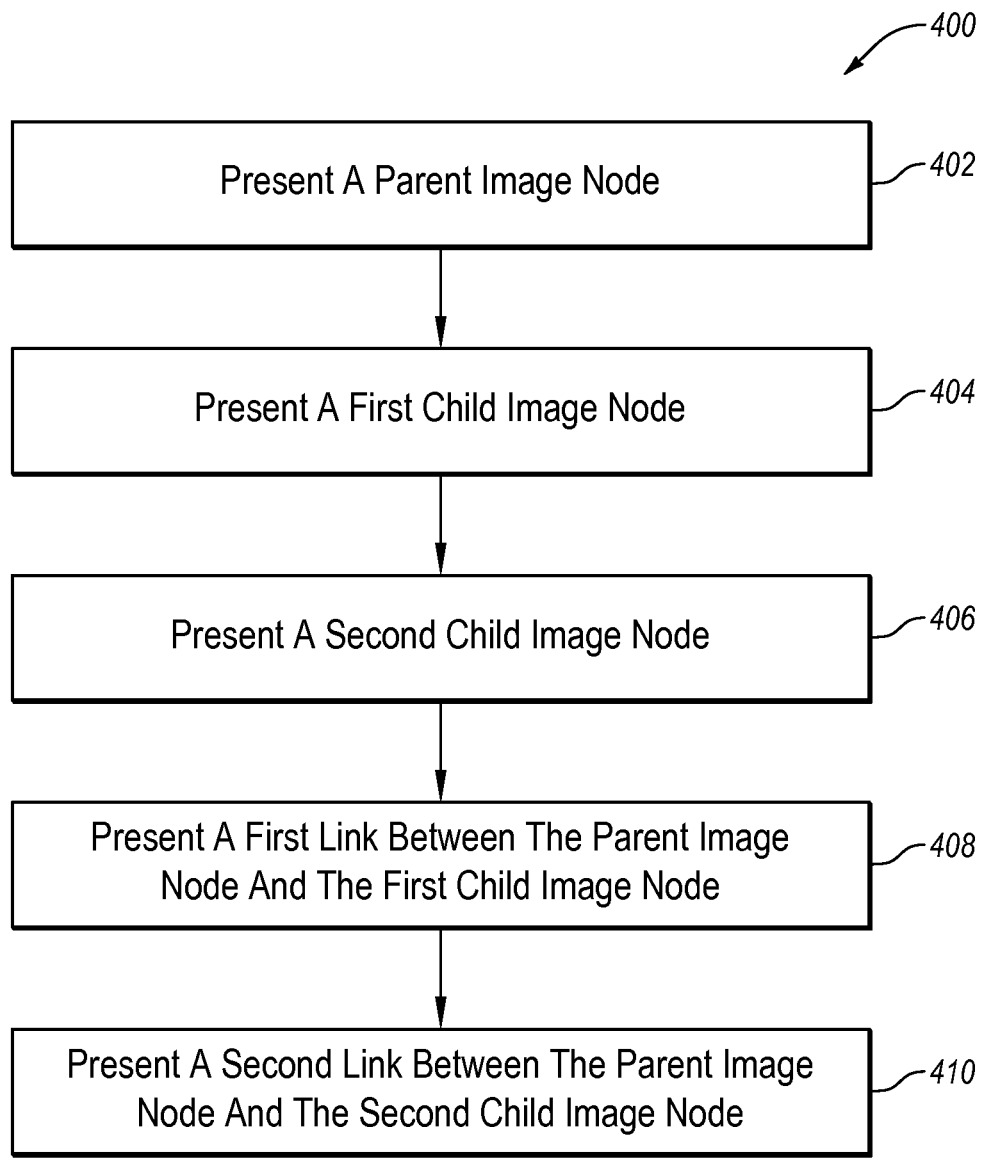
FIGS. 4-6 are schematic flowchart diagrams of example methods for displaying relationships between image backup files in a backup job.
Figure 5:
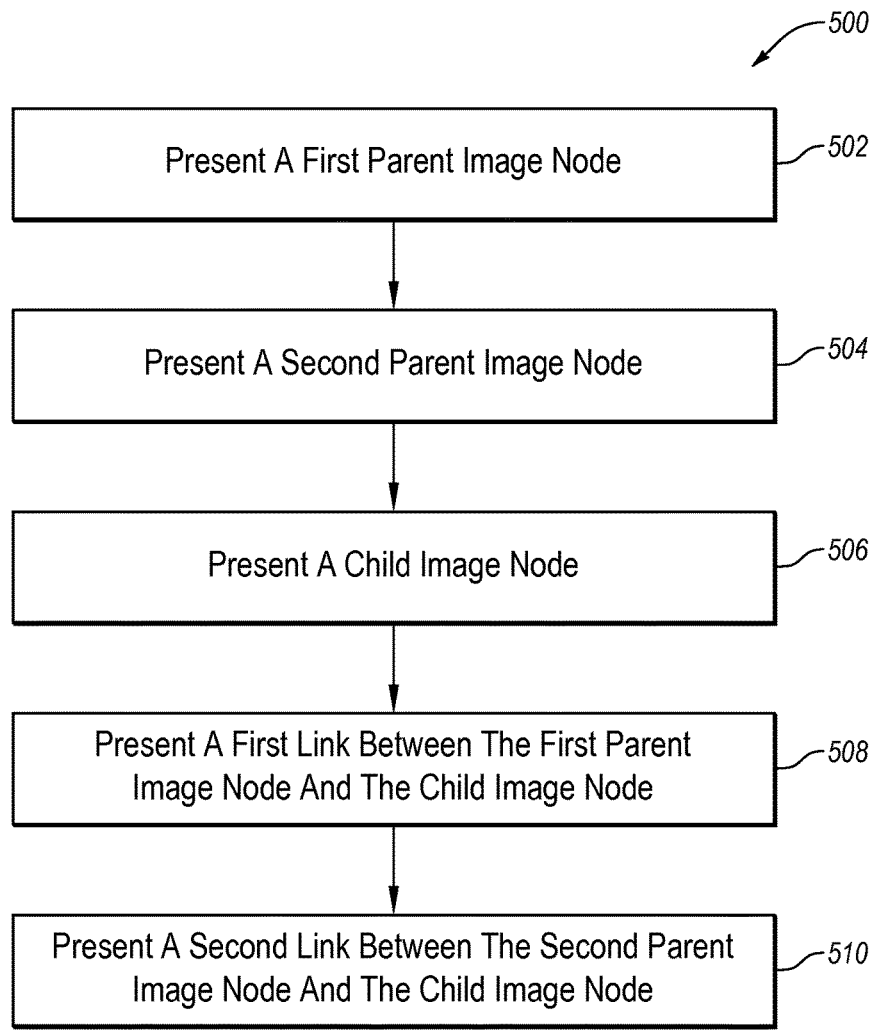
Figure 6:
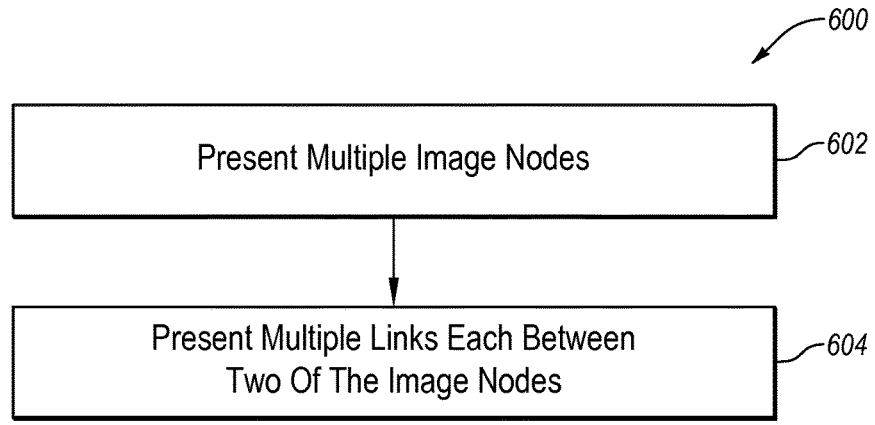

FIGS. 4-6 are schematic flowchart diagrams of example methods 400, 500, and 600 for displaying relationships between image backup files in a backup job. The methods 400, 500, and 600 may be implemented, in at least some embodiments, by the backup module 110 of the destination system 104 of FIG. 1. For example, the backup module 110 may be configured to execute computer instructions to perform operations of displaying relationships between image backup files in a backup job of the source storage 106, as represented by one or more of the steps of the methods 400, 500, and 600. Prior to the methods 400, 500, and 600, various events of a backup job may have transpired, which may have resulted in the creation of one or more image backup files. Although illustrated as discrete steps, various steps may be divided into additional steps, combined into fewer steps, or eliminated, depending on the desired implementation. The methods 400, 500, and 600 will now be discussed with reference to FIGS. 1-5.

The method 400 of FIG. 4 may begin at step 402, in which a parent image node is presented. Then, at step 404, a first child image node is presented and, at step 406, a second child image node is presented, with each of the image nodes representing an image backup file of a source storage. For example, the backup module 110 of FIG. 1 may present, at steps 402, 404, and 406, the example GUI 200 of FIG. 3 to a user on a display associated with the source system 102 or the destination system 104, such as the display device 114 for example. The GUI 200 of FIG. 3 may include the example GUI relationship graph 300 of FIG. 3. The GUI relationship graph 300 may include the graph display panel 302 upon which a parent base image node 306, a first child incremental image node 308, and a second child incremental image node 322 are displayed. Each of the image nodes 306, 308, and 322 represents an image backup file of the storage 216 that was created as part of the backup job 212.

Then, at step 408, a first link between the parent image node and the first child image node is presented and, at step 410, a second link between the parent image node and the second child image node is presented. Continuing with the example above, the backup module 110 of FIG. 1 may present, at step 408, the link 348 between the parent base image node 306 and the first child incremental image node 308. The link 348 represents a first parent-child relationship between the parent base image node 306 and the first child incremental image node 308. The backup module 110 of FIG. 1 may then present, at step 410, the link 350 between the parent base image node 306 and the second child collapsed image node 322. The link 350 represents a second parent-child relationship between the parent base image node 306 and the second child collapsed image node 322. The links 348 and 350 represent a forward branching path, as described elsewhere herein.

The method 500 of FIG. 5 may begin at step 502, in which a first parent image node is presented. Then, at step 504, a second parent child image node is presented and, at step 506, a child image node is presented, with each of the image nodes representing an image backup file of a source storage. Continuing with the example above, the backup module 110 of FIG. 1 may present, at steps 502, 504, and 506, a first parent incremental image node 318, a second parent collapsed image node 326, and a child incremental image node 320. Each of the image nodes 318, 326, and 320 represents an image backup file of the storage 216 that was created as part of the backup job 212.

Then, at step 508, a first link between the first parent image node and the child image node is presented and, at step 510, a second link between the second parent image node and the child image node is presented. Continuing with the example above, the backup module 110 of FIG. 1 may present, at step 508, the link 352 between the first parent incremental image node 318 and the child incremental image node 320. The link 352 represents a first parent-child relationship between the first parent incremental image node 318 and the child incremental image node 320. The backup module 110 of FIG. 1 may then present, at step 510, the link 354 between the second parent collapsed image node 326 and the child incremental image node 320. The link 354 represents a second parent-child relationship between the second parent collapsed image node 326 and the child incremental image node 320. The links 352 and 354 represent a reverse branching path, as described elsewhere herein.

The method 600 may begin at step 602, in which multiple image nodes are presented. Then, at step 604, multiple links are presented each between two of the image nodes. Continuing with the example above, the backup module 110 of FIG. 1 may present, at step 602, the image nodes 306-310. Each of the image nodes 306-310 represents an image backup file of the storage 216 that was created as part of the backup job 212. The backup module 110 of FIG. 1 may then present, at step 604, a first link 348 between the image node 306 and the image node 308 and a second link 356 between the image node 308 and the image node 310. The first link 348 represents a first parent-child relationship between the image node 306 and the image node 308 and the second link 356 represents a second parent-child relationship between the image node 308 and the image node 310. The links 348 and 356 represent a chain path, as described elsewhere herein.

It is understood that any of the example methods 400, 500, and 600 may further include other steps associated with any of the other functionality of the GUI relationship graph 300, as described elsewhere herein.

As illustrated in the example methods 400, 500, and 600, a user may be presented with the relationships between image backup files in a backup job, thus enabling a user to quickly grasp relationships, timing, and other statistics of the image backup files of a backup job in order to ascertain the current state of the backup job, even where the relationships are complex due to image backup files being created as a result of the collapsing, mounting, or copying of image backup files.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose computer, special purpose computer, or virtual computer such as a virtual machine. Combinations of the above may also be included within the scope of computer-readable media.

Computer-executable instructions comprise, for example, instructions and data which cause a general purpose computer, special purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. One or more non-transitory computer-readable media storing one or more programs that are configured, when executed by one or more processors, to generate and visually present, on an electronic display device associated with the one or more processors, a graphical user interface (GUI) relationship graph for displaying relationships between image backup files in a backup job, the GUI relationship graph comprising:
  a parent image node, a first child image node, and a second child image node, each image node representing an image backup file of a source storage; and
  a forward branching path including a first link and a second link, the first link representing a first parent-child relationship between the parent image node and the first child image node, the second link representing a second parent-child relationship between the parent image node and the second child image node.

2. The one or more non-transitory computer-readable media as recited in claim 1, wherein the parent image node represents a base image backup file, an incremental image backup file, or a collapsed image backup file.

3. The one or more non-transitory computer-readable media as recited in claim 2, wherein each of the first and second image nodes represents an incremental image backup file or a collapsed image backup file.

4. The one or more non-transitory computer-readable media as recited in claim 3, wherein a shape of each of the image nodes indicates whether the image node represents a base image backup file, an incremental image backup file, or a collapsed image backup file.

5. The one or more non-transitory computer-readable media as recited in claim 4, wherein a style of each of the links further represents an event that resulted in the creation of the corresponding child image node.

6. The one or more non-transitory computer-readable media as recited in claim 5, wherein the event includes a mounting of one or more image backup files, a collapsing of two or more image backup files, or a copying of an image backup file.

7. The one or more non-transitory computer-readable media as recited in claim 5, wherein the GUI relationship graph further comprises a legend which presents a meaning for the shape of each of the image nodes and/or the style of each of the links.

8. The one or more non-transitory computer-readable media as recited in claim 7, wherein the legend further presents one or more controls that each enables image nodes having a particular shape and/or links having a particular style to be hidden in the GUI relationship graph.

9. One or more non-transitory computer-readable media storing one or more programs that are configured, when executed by one or more processors, to generate and visually present, on an electronic display device associated with the one or more processors, a graphical user interface (GUI) relationship graph for displaying relationships between image backup files in a backup job, the GUI relationship graph comprising:
  a first parent image node, a second parent image node, and a child image node, each image node representing an image backup file of a source storage; and
  a reverse branching path including a first link and a second link, the first link representing a first parent-child relationship between the first parent image node and the child image node, the second link representing a second parent-child relationship between the second parent image node and the child image node.

10. The one or more non-transitory computer-readable media as recited in claim 9, where at least one of a color, a texture, a pattern, and a shape of each of the image nodes indicates whether the image node represents a base image backup file, an incremental image backup file, or a collapsed image backup file.

11. The one or more non-transitory computer-readable media as recited in claim 9, wherein, upon selection of one of the image nodes, the GUI relationship graph is configured to:
  visually present additional details regarding the image backup file corresponding to the image node; and
  visually present one or more available actions for the image backup file corresponding to the image node.

12. The one or more non-transitory computer-readable media as recited in claim 9, wherein, upon selection of one of the image nodes, the GUI relationship graph is configured to visually present a flag corresponding to the image backup file corresponding to the image node.

13. The one or more non-transitory computer-readable media as recited in claim 12, wherein the flag visually presents a snapshot time of the corresponding image backup file.

* * * * *